(12) United States Patent
Wilshire

(10) Patent No.: US 8,161,328 B1
(45) Date of Patent: Apr. 17, 2012

(54) DEBUGGER INTERFACE

(75) Inventor: James C. Wilshire, Capistrano Beach, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/789,394

(22) Filed: May 27, 2010

(51) Int. Cl.
*G06F 11/00* (2006.01)

(52) U.S. Cl. ......................................... 714/34

(58) Field of Classification Search ............ 714/34
See application file for complete search history.

(56) References Cited

U.S. PATENT DOCUMENTS

| | | | | |
|---|---|---|---|---|
| 6,032,268 A * | 2/2000 | Swoboda et al. | ......... | 714/30 |
| 6,189,140 B1 * | 2/2001 | Madduri | ......... | 717/128 |
| 6,321,329 B1 | 11/2001 | Jaggar et al. | | |
| 6,446,221 B1 * | 9/2002 | Jaggar et al. | ......... | 714/30 |
| 6,567,933 B1 * | 5/2003 | Swoboda et al. | ......... | 714/31 |
| 6,857,084 B1 | 2/2005 | Giles | | |
| 6,948,098 B2 * | 9/2005 | Pillay et al. | ......... | 714/34 |
| 7,039,831 B2 * | 5/2006 | Phillips | ......... | 714/25 |
| 7,506,205 B2 | 3/2009 | Pedersen et al. | | |
| 7,698,544 B2 * | 4/2010 | Lell et al. | ......... | 713/1 |
| 7,823,133 B2 * | 10/2010 | Tamagno et al. | ......... | 717/127 |
| 2003/0037225 A1 | 2/2003 | Deng et al. | | |
| 2003/0120968 A1 * | 6/2003 | Andress et al. | ......... | 714/25 |
| 2005/0149892 A1 * | 7/2005 | Yee | ......... | 716/4 |
| 2007/0214389 A1 * | 9/2007 | Severson et al. | ......... | 714/30 |
| 2009/0055637 A1 * | 2/2009 | Holm et al. | ......... | 713/1 |
| 2010/0011250 A1 | 1/2010 | Pedersen | | |
| 2010/0174892 A1 * | 7/2010 | Steeb | ......... | 712/227 |

OTHER PUBLICATIONS

Power.org Target Debug Capabilities Specification.*

* cited by examiner

*Primary Examiner* — Amine Riad

(57) ABSTRACT

A system is disclosed comprising a processor, and a debug circuit. The debug circuit comprises a reset circuit configured to detect when the system is released from a reset, a debugger detection circuit configured to detect whether an external debugger is connected to the system at a time the reset circuit detects a release from the reset, and a halt circuit configured to halt operation of the processor when the debugger detection circuit detects the debugger at the time of release from the reset.

20 Claims, 5 Drawing Sheets

DEBUGGER INTERFACE

BACKGROUND

A system having one or more processors may include debug resources to facilitate debugging of the system. For example, a system on a chip (SOC) may include debug resources integrated on the chip to facilitate debugging. The debug resources may include a trace source that provides a trace output of code execution and/or data in a processor for monitoring the operation of the processor. An operator may connect an external debugger to the system to control the trace source and view the trace output of the trace source. The external debugger can program the trace source through a debug access port (DAP) in the system and receive the trace output of the trace source through a trace port. For example, the external debugger can program the trace source to trace a particular program routine executed by the processor to debug the program routine.

When a system is reset (e.g., power on reset), a processor in the system may immediately start running after the reset is released. To properly debug the system in this case, the debugger typically has to gain control of the processor to temporarily halt operation of the processor so that the debugger has time to program the debug resources, which may be difficult for the debugger to do.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
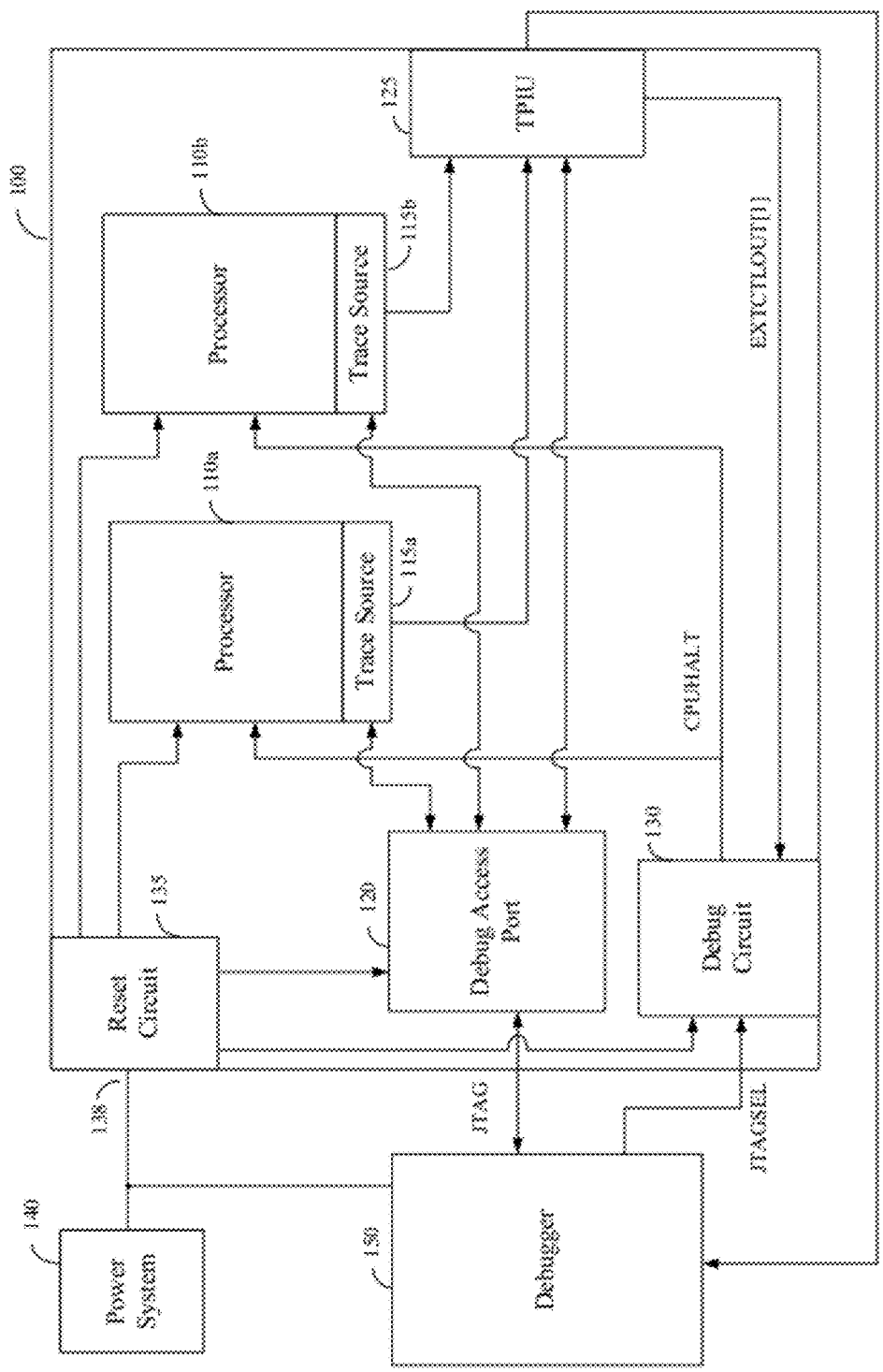
FIG. 1 is a block diagram of a system including debug resources according to an embodiment of the present invention.

FIG. 1 shows a system 100 including two processors 110$a$ and 100$b$ and debug resources according to an embodiment of the present invention. The system 100 may be implemented as a system on a chip (SOC), in which the processors 110$a$ and 110$b$ and the debug resources are integrated on a chip. In addition, memory may be integrated on the chip to store code executed by the processors 110$a$ and 110$b$ and/or data processed by the processors 110$a$ and 110$b$. Alternatively, the system 100 may be implemented with two or more chips on a printed circuit board (PCB). The debug resources include two trace sources 115$a$ and 115$b$, a debug access port (DAP) 120, and a trace port interface unit (TPIU) 125. Those skilled in the art will appreciate that the system 100 may include any number of processors and components depending on the particular application of the system. An example in which the system 100 is used in a disk drive is provided below.

Each trace source 115$a$ and 115$b$ is configured to trace code execution and/or data in the respective processor 110$a$ and 110$b$ for monitoring operation of the processor 110$a$ and 110$b$. Each trace source 115$a$ and 115$b$ may be implemented using an embedded trace macrocell. An operator debugging the system 100 may connect an external debugger 150 to the system 100 to control the trace sources 115$a$ and 115$b$ and view the trace outputs of the trace sources 115$a$ and 115$b$. The debugger 150 can program the trace sources 115$a$ and 115$b$ through the DAP 120 and receive the trace outputs of the trace sources 115$a$ and 115$b$ through the TPIU 125. For example, the debugger 150 may program one of the trace sources 115$a$ and 115$b$ to trace a particular program routine executed by the respective processor 110$a$ and 110$b$ to debug the program routine. The debugger 150 can program at which code address tracing is trigger and/or under which conditions tracing is triggered. The debugger 150 may interface with the DAP 120 using a Joint Test Action Group (JTAG) interface or other type of interface.

The system 100 also comprises a reset circuit 135 configured to reset various components of the system 110 by outputting reset signals to the various components. For example, the reset circuit 135 may reset the various components when the system 100 is powered up and/or some other event occurs. The reset may be used to place the system in a known initial state. The reset circuit 135 may be triggered to reset the system 100 by firmware, hardware, a power system 140, and/or the debugger 150, examples of which are provided below.

The reset circuit 135 may be connected to the power system 140, as shown in the example in FIG. 1. The power system 140 may monitor power to the system 100 and output a power on reset signal to the reset circuit 135 after power loss, power fluctuations or some other power-related event. In response to receiving the power on reset from the power system 140, the reset circuit 135 may output reset signals to various components of the system 100 to reset the system 100.

The debugger 150 may also be connected to the reset circuit 135 to allow the debugger 150 to reset the system 100. In one embodiment, the debugger 150 may output a reset signal to the reset circuit 135 to reset the system 100. In response to receiving the reset from the debugger 150, the reset circuit 135 may output reset signals to various components of the system 100 to reset the system 100.

Reset may also be triggered by firmware in the system 100. In this example, the firmware may send a command to the reset circuit 135 to reset the system 100. The firmware may reset the system 100 in response to certain events in the system 100 such as a firmware detected event requiring a reset.

Reset may also be triggered by hardware in the system 100. In this example, the hardware may send a command to the reset circuit 135 to reset the system 100. The hardware may reset the system 100 in response to certain events in the system 100 such as a firmware detected event requiring a reset.

In one embodiment, the reset circuit 135 may be connected to the power system 140 and the debugger 150 through a common input/output (I/O) 138, in which a voltage at the I/O is normally pulled high, e.g., by an open drain circuit. In this embodiment, the power system 140 or debugger 150 may trigger a reset by driving the voltage at the I/O 138 low. In this embodiment, the debugger 150 may sense when the system 100 is reset by sensing when the voltage at the I/O 138 is low. The debugger 150 may also sense when the system 100 is released from the reset by sensing a transition of the voltage at the I/O 138 from low to high.

The system 100 further comprises a debug circuit 130. In one embodiment, the debug circuit 130 is configured to detect whether the debugger 150 is connected to the system 100 at the time the system 100 is released from a reset. If the debugger 150 is connected to the system 100 at the time of release from the reset, then the debug circuit 130 halts operation of the processors 110a and 110b. This prevents the processors 110a and 100b from running immediately after the reset, allowing the debugger 150 to program one or more of the trace sources 115a and 115b and/or other debug resources while the processors 110a and 110b are in the halted state. If the debugger 150 is not connected to the system 100 at the time of release from the reset, then the debug circuit 130 does not halt operation of the processors 110a and 110b.

In one embodiment, the debugger 150 connects to the debug circuit 130 through a JTAGSEL input. The debug circuit 130 may detect the presence of the debugger 150 by receiving a detection signal from the debugger 150 through the JTAGSEL input when the debugger 150 is connected to the system 100. Those skilled in the art will appreciate that the debug circuit 130 may receive the detection signal from the debugger 150 through other types of interfaces.

The debug circuit 130 may also receive a reset signal from the reset circuit 135 when the system 100 is reset and detect the time of release from a reset when the reset signal is released. The debug circuit 130 may halt operations of the processors 110a and 110b by outputting a CPUHALT signal to the processors 110a and 110b.

After the debugger 150 has completed programming the one or more trace sources 115a and 115b and/or other debug resources, the debugger 150 may output a halt release signal to the system 100. The debug circuit 130 is configured to detect the halt release from the debugger 150 and, in response to the halt release, to release the processors 110a and 110b from the halted state.

Thus, the debug circuit 130 halts operation of the processors 110a and 110b when the debug circuit 130 detects the debugger 150 at the time of release from a reset. This allows the debugger 150 to program debug resources in the system 100 while the processors 110a and 110b are in the halted state. An advantage of the debug circuit 130 is that the debugger 150 does not have to gain control of the processors 110a and 110b when the system is reset to halt the processors 110a and 110b. This is because the debug circuit 130 halts the processors 110a and 110b for the debugger 150 when the debugger 150 is connected to the system 100.

The debug circuit 130 may keep the processors 110a and 110b in the halted state until released by the debugger 150. Thus, the debug circuit 130 allows the debugger 130 to control when the processors 110a and 110b are released, for example, after the debugger 150 has completed programming the debug resources.

The debug circuit 130 also facilitates trace through a power down. For example, the system 100 may experience a power loss during tracing, in which case programming of the debug resources (e.g., trace sources 115a and 115b) may be lost. In this example, the power system 140 may reset the system 100 through the rest circuit 135 when power is restored. Upon release from the reset, the debug circuit 130 detects the debugger 150 and halts operation of the processors 110a and 110b. This allows the debugger 150 to reprogram the debug resources (e.g., trace sources 115a and 115b) to resume tracing. The debugger 150 may reprogram the trace sources 115a and 115 to begin tracing from the time the power loss occurred. When the debugger 150 has competed reprogramming the debug resources, the debugger 150 may instruct the debug circuit 130 to release the processors 110a and 110b from the halted state. In this example, the debugger 150 may sense a power on reset by monitoring the voltage at the I/O 138 of the reset circuit 135, as discussed above.

The debugger circuit 130 also facilitates reprogramming of the debug resources by the debugger 150. For example, the debugger 150 may trigger the reset circuit 135 to reset the system 100. Upon release from the reset, the debug circuit 130 detects the debugger 150 and halts operation of the processors 110a and 110b, allowing the debugger 150 to reprogram the debug resources. When the debugger 150 has competed reprogramming the debug resources, the debugger 150 may instruct the debug circuit 130 to release the processors 110a and 110b from the halted state.

Figure 2:
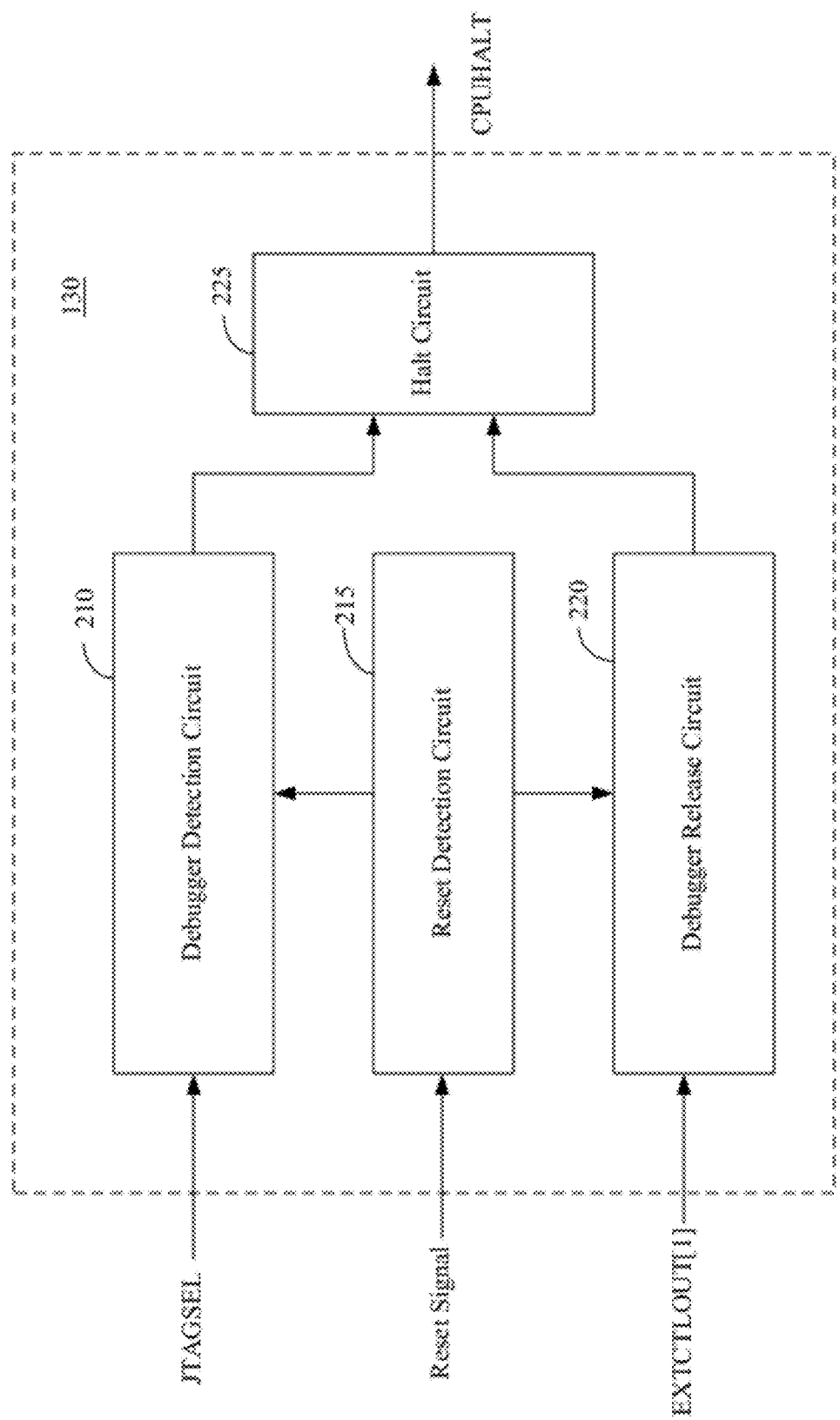
FIG. 2 shows a debug circuit according to an embodiment of the present invention.

FIG. 2 shows the debug circuit 130 according to an embodiment of the present invention. In this embodiment, the debug circuit 130 includes a debug detection circuit 210, a reset detection circuit 215, a debugger release circuit 220 and a halt circuit 225.

The reset detection circuit 215 is configured to detect when the system 100 is reset and when the system 100 is released from the reset. For example, the reset detection circuit 215 may detect when the system 100 is reset by receiving a reset signal from the reset circuit 135. The reset detection circuit 215 may then detect when the system 100 is released from the reset by detecting when the reset signal is released.

The debugger detection circuit 210 is configured to receive a signal from the reset detection circuit 215 indicating when the system 100 is released from the reset. The debugger detection circuit 210 detects whether the debugger is connected to the system 100 at the time of release from the reset. The debugger detection circuit 210 may detect the presence of the debugger 150 by receiving a signal from the debugger 150 through the JTAGSEL input when the debugger 150 is connected to the system 100.

The halt circuit 225 is configured to receive a signal from the debugger detection circuit 210 indicating whether the debugger 150 is connected at the time of release from the reset. If the debugger 150 is connected at the time of release from the reset, then the halt circuit 225 halts operation of the processors 110a and 110b, e.g., by asserting the CPUHALT signal. If the debugger 150 is not connected at the time of release from the reset, then the halt circuit 225 does not halt operation of the processors 110a and 100b until the next reset. This prevents the processors 110a and 110b from being halted in the middle of executing code when the debugger 150 is connected after the release from the reset (hot plug).

The debugger release circuit 220 is configured to receive a signal from the reset detection circuit 215 indicating when the system 100 is reset. This initializes the debugger release circuit 220 to wait for a halt release signal from the debugger 150. The debugger release circuit 220 then detects the halt release signal from the debugger 150, for example, after the debugger 150 has completed programming debug resources.

The halt circuit 225 is configured to receive a signal from the debugger release circuit 220 indicating that the debugger 150 has issued a halt release. In response, the halt circuit 225 is configured to release the processors 110a and 110b from the halted state, e.g., by deasserting the CPUHALT signal. Once released, the halt circuit 225 is configured not to halt operation of the processors 110a and 110b again until the next reset. This prevents the processors 110a and 110b from being halted again until the next reset for the case where the debugger is removed and then reconnected (hot plug).

Figure 3:
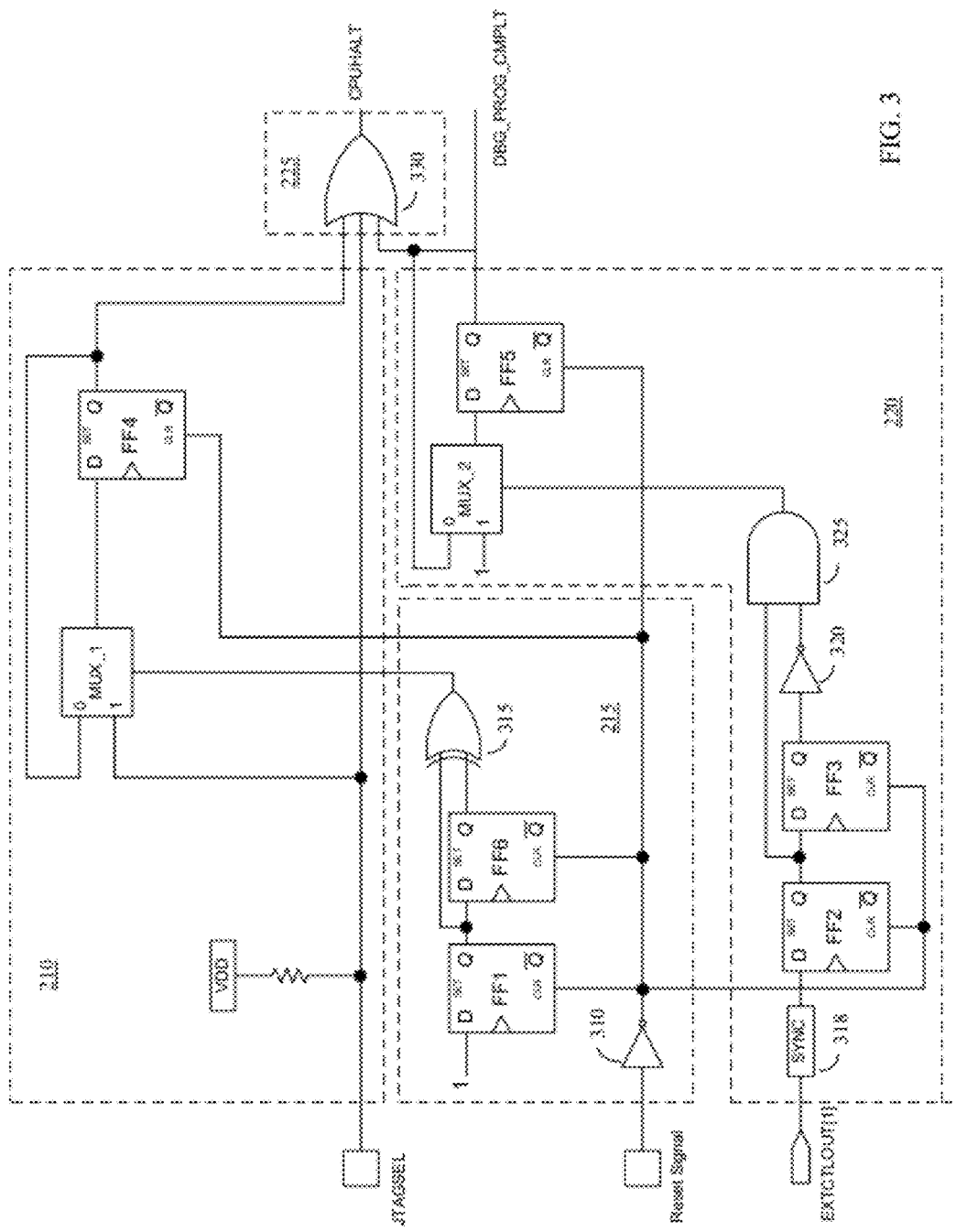
FIG. 3 shows a debug circuit according to another embodiment of the present invention.

FIG. 3 shows the debug circuit 130 according to another embodiment of the present invention. In this embodiment, the voltage at the JTAGSEL input is high (logic 1) when the debugger 150 is not connected to the system 100 and low (logic 0) when the debugger 150 is connected to the system 100. This is because the JTAGSEL input is pulled to voltage VDD when the debugger 150 is not connected and driven low by the debugger 150 when the debugger 150 is connected.

Also in this embodiment, the voltage at the reset input is low (logic 0) when the reset signal is asserted and high (logic 1) when the reset is not asserted. Further, the voltage at the CPUHALT output is low (logic 0) when the CPUHALT signal is asserted and high (logic 1) when the CPUHALT signal is not asserted. Further, the debugger 150 releases the processors 110a and 110b from the halted state by programming a release bit from a logic 0 to a logic 1. The release bit may be an EXTCTLOUT[1] bit stored in a register in the TPIU 125. For purposes of discussion below, the example of the EXTCTLOUT[1] is used. However, those skilled in the art will appreciate that the release bit may be stored in any location within or outside the system 100.

In this embodiment, the debugger detection circuit 210 comprises a multiplexer MUX_1 and a flip flop FF4. The reset detection circuit 215 comprises an inverter 310, flip flops FF1 and FF6 and an exclusive OR gate 315. The debugger release circuit 220 comprises a synchronizer 318, flip flops FF2, FF3, and FF5, an inverter 320, an AND gate 325 and a multiplexer MUX_2. The halt circuit 225 comprises an OR gate 330.

Operation of the debugger detection circuit 210 will now be described for the example where the reset signal is released after the system 100 has been reset. In this example, all of the flip flops FF1-FF6 are clocked by the same clock.

One clock cycle after the reset signal is released, a one cycle pulse is generated to select the "1" input of multiplexer MUX_1, which captures the value of the JTAGSEL input. Flip flops FF1 and FF6 are used to generate the one cycle pulse through the exclusive OR gate 315. The one cycle pulse causes the "1" input of multiplexer MUX_1, which is connected to the JTAGSEL input, to be switched only once when the reset signal is released. Thus, the "1" input of multiplexer MUX_1 captures the value of the JTAGSEL input at the time of release from reset.

The output of multiplexer MUX_1 is captured in flip flop FF4 and held until the next reset. If the debugger 150 is connected at the time of release from reset, then flip flop FF4 captures and outputs a logic 0 and if the debugger 150 is not connected at the time of release from reset, then flip flop FF4 captures and outputs a logic 1. Flip flop FF4 maintains this logic value until the next reset. Thus, flip flop FF4 remembers whether the debugger 150 was connected at the time of release from reset. The flip flop FF4 prevents the CPUHALT signal from being asserted when a hot plug occurs (e.g., the debugger 150 is connected after reset has been released and the processors 110a and 110b have started running).

Operation of the debugger release circuit 220 will now be described for the example in which the EXTCTLOUT[1] bit is logic 0 at the time of release from reset. In this example, the debugger release circuit 220 outputs a logic 0 until the debugger 150 releases the processors 110a and 110b by programming the EXTCTLOUT[1] bit to logic 1. When the debugger 150 programs the EXECTLOUT[1] bit to logic 1, this signal is synchronized by the synchronizer 318 in the clock domain of the debug circuit 130. The synchronized signal generates a one cycle pulse using flip flops FF2 and FF3 and the AND gate 330 to select the "1" input of multiplexer MUX_2, which is held at logic 1. This sets flip flop FF5 to logic 1, which releases the processors 110a and 110b from the halted state and allows the processors to begin executing code, as discussed further below. Flip flop FF5 does not clear back to zero until the next reset, which prevents the CPUHALT signal from being asserted again until the next reset for the case where the debugger is removed and then reconnected (hot plug).

The outputs of flip flops FF4 and FF5 and the JTAGSEL input are inputted to the OR gate 330 of the halt circuit 225. The OR gate 330 outputs a logic 0 (CPUHALT signal asserted) when all three of its inputs are logic 0 and outputs a logic 1 (CPUHALT signal deasserted) when one or more of its inputs is logic 1.

If the debugger 150 is connected at the time of release from reset, then the halt circuit 225 asserts the CPUHALT signal to halt operation of the processors 110a and 110b. This is because flip flops FF4 and FF5 output a logic 0 to the OR gate 330 of the halt circuit 225 when the debugger 150 is connected at the time of release from reset and the JTASEL input is driven low by the debugger 150.

If the debugger 150 is not connected at the time of release, then the halt circuit 225 does not assert the CPUHALT signal until the next reset. This is because flip flop FF4 outputs a logic 1 to the OR gate 330 of the halt circuit 225 when the debugger 150 is not connected at the time of release from reset. In this case, flip flop FF4 maintains the logic 1 until the next reset even if the debugger 150 is later connected to the system (hot plug). This prevents the CPUHALT signal from being asserted during a hot plug.

When the debugger 150 programs the EXTCTLOUT[1] bit to one, the halt circuit 225 deasserts the CPUHALT signal to release the processors 110a and 110b from the halted state. This is because flip flop FF5 output a logic 1 to the OR gate 330 of the halt circuit 225 when the debugger 150 releases the processors 110a and 110b from the halted state. Once released, flip flop FF5 maintains the logic 1 until the next reset. Thus, flip flop FF5 remembers that the debugger 150 has released the processors 110a and 110b. This prevents the CPUHALT signal from being asserted again until the next reset for the case where the debugger 150 is removed and then reconnected (hot plug).

In one embodiment, the CPUHALT signal may be sent to only processor 110a. For example, processor 110b may be a slave to processor 110a, in which processor 110b does not start running after a reset until instructed to by processor 110a. In this example, after the CPUHALT signal to processor 110a is deasserted, processor 110a may start running and then instruct processor 110b to start running.

A procedure for releasing the processors 110a and 110b from the halted state when the debugger 150 is connected will now be discussed.

First, the reset signal is asserted. The CPUHALT signal is also asserted due to the fact that the JTAGSEL input is held low when the debugger 150 is connected. Both flip flops FF4 and FF5 are reset so that all three inputs to the OR gate 330 of the halt circuit 225 are logic 0. Flip flop FF4 remains at logic 0 when the reset is released since the debugger 150 is connected. Thus, the CPUHALT signal remains asserted after the reset is released. The debugger 150 is now in control of releasing the CPUHALT signal via the EXTCTLOUT[1] bit.

The debugger 150 senses the release of the reset. The debugger 150 waits until access to the debug resources of the system 100 are available through the JTAG interface. After gaining access, the debugger 150 programs the debug resources (e.g., the trace sources 115a and 115b). When the debug programming is completed, the debugger 150 writes a logic 1 to the EXTCTLOUT[1] bit to release the CPUHALT signal allowing the processors 110a and 110b to begin executing code.

When the debugger 150 is not connected, the CPUHALT signal is not asserted at the time of release from reset, and the processors 110a and 110b immediately begin to execute code upon leaving reset.

Figure 4:
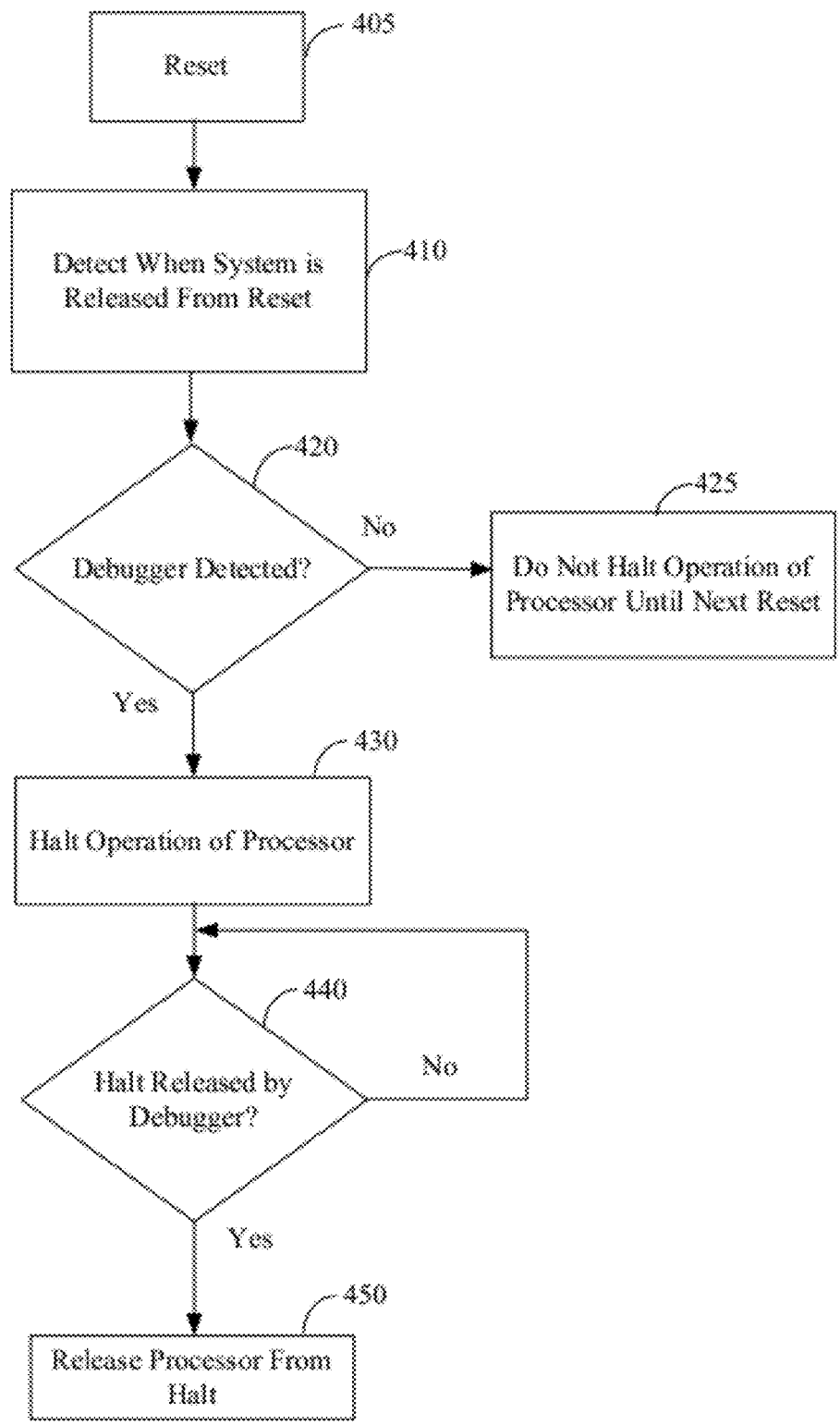
FIG. 4 is a flow diagram of a method for debugging a system according to an embodiment of the present invention.

FIG. 4 shows a method for debugging a system including a processor according to an embodiment of the present invention. The method may be performed by the debug circuit 130.

In step 405, the system 100 is reset. In step 420, the debug circuit 130 detects when the system 100 is released from the reset. In step 420, the debug circuit 130 detect whether a debugger 150 is connected to the system at the time of release from the reset. If the debugger 150 is not detected, then the debug circuit 130 proceeds to step 425. If the debugger 150 is detected, then the debug circuit 130 proceeds to step 430.

In step 425, the debug circuit 130 does not halt operation of the processor until the next reset. The debug circuit 130 may perform step 425 by not asserting the CPUHALT signal until the next reset. In step 430, the debug circuit 130 halts operation of the processor. The debug circuit 130 may perform step 430 by asserting the CPUHALT signal.

In step 440, the debug circuit 130 determines whether the debugger 150 has released the processor from the halted state. If the processor has not been released by the debugger, then the debug circuit 130 stays at step 440. If the processor has been released by the debugger, then the debug circuit 130 proceeds to step 450. In step 450, the debug circuit 130 releases the processor from the halted state, e.g., by deasserting the CPUHALT signal.

Figure 5:
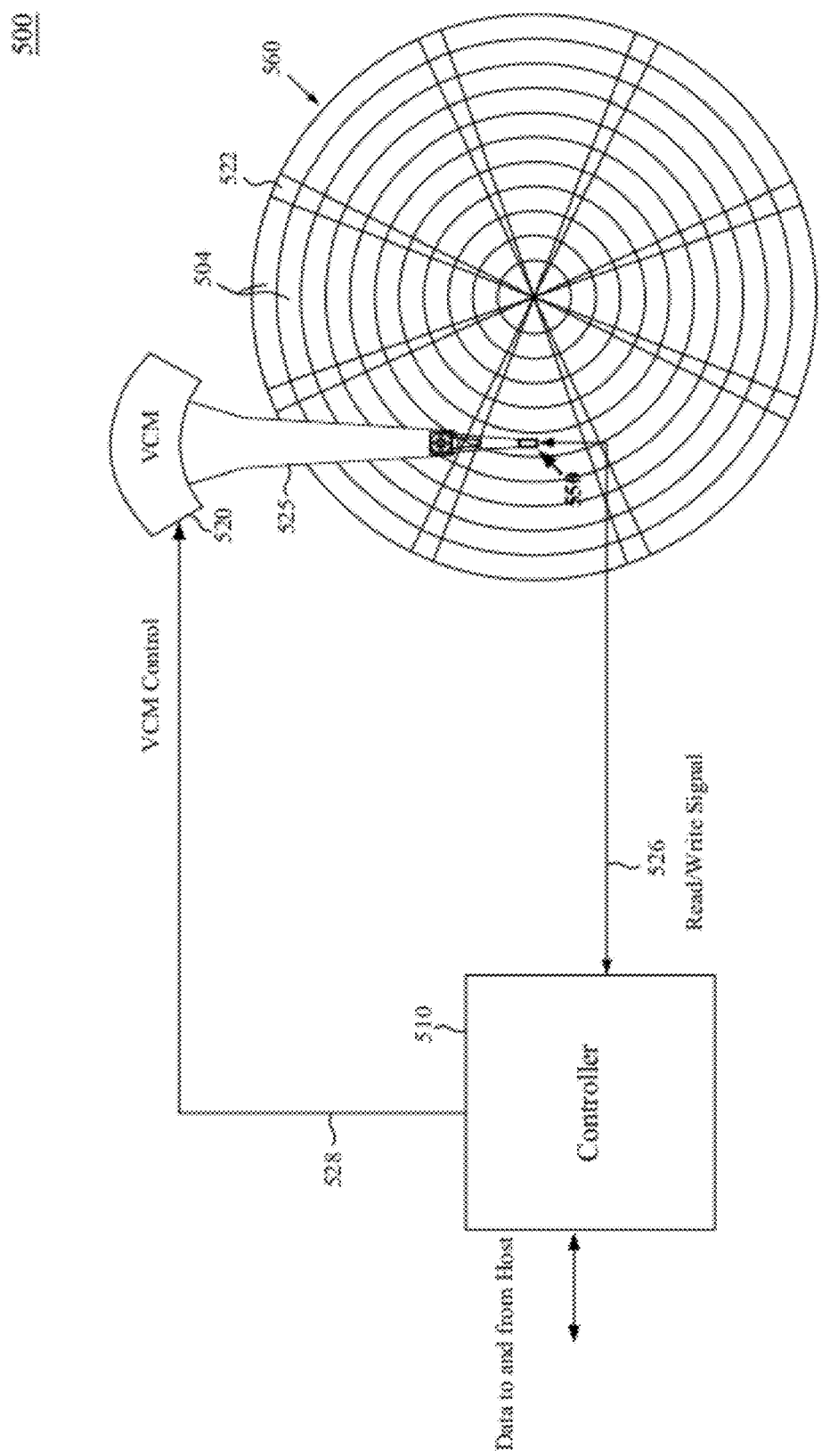
FIG. 5 is a block diagram of a data storage device according to an embodiment of the present invention.

FIG. 5 shows a data storage device, disk drive 500, which may be debugged according embodiments of the present invention. Other data storage devices, such as solid-state drives, could be debugged according to other embodiments. The disk drive 500 comprises a rotating magnetic disk 560 and a head 550 connected to the distal end of an actuator arm 525. The actuator arm 525 is rotated about a pivot by a voice coil motor (VCM) 520 to position the head 550 radially over the disk 560. The disk 560 comprises a number of radially spaced, concentric tracks 504. Each track 504 may be partitioned into a number of data sectors (not shown) that are spaced circumferentially along the track 504. The disk 560 may also comprise a plurality of embedded servo sectors 522, each of which may include position information that can be read from the disk 560 by the head 550 to determine the position of the head 550 over the disk 560.

The disk drive 500 also comprises a controller 510 that performs various operations of the disk drive 500 described herein. The controller 510 may be implemented using the system 100 in FIG. 1. For example, the processors 110a and 100b in FIG. 1 may execute various functions of the controller 510, as discussed further below.

To write data to the disk 560, the controller 510 first positions the head 50 at a desired track 504 on the disk 560 by sending a control signal 528 to the VCM 520. The controller 510 may include a servo control system that positions the head 550 using the VCM 520 based on position information read from one or more embedded servo sectors 522. The controller 510 processes data to be written to the disk 560 into a write signal 526, which is outputted to the head 550. The head 550 converts the write signal 526 into a magnetic field that magnetizes the surface of the disk 560 based on the write signal, thereby magnetically writing the data to the disk 560.

To read data from the disk 560, the controller 510 positions the head 550 at a desired data track 504 on the disk 560. The head 550 generates a read signal based on the magnetization of the disk surface under the head 550. The controller 510 receives and processes the read signal 526 into a data sequence.

The controller 510 may write data to and read data from the disk 560 in response to write/read commands from a host (e.g., host processor). For example, the controller 510 may receive a host write command including data to be written to the disk 560, and execute the host write command by writing the data to the disk 560. The controller 510 may also receive a host read command requesting data stored on the disk 560, and execute the host read command by reading the requested data from the disk 560 and sending the read data to the host.

As discussed above, the controller 510 may be implemented using the system 100 in FIG. 1. In one embodiment, processor 110a may handle read/write commands from the host and determine the physical locations on the disk 560 to which data is written and from which data is read. Processor 110b may control actuation of the actuator arm 25 via the VCM 520 to position the head 550 at a desired location of the disk 560. For example, processor 110a may determine where to write data to the disk 560. Processor 110a may then communicate the corresponding location on the disk 560 to processor 110b, which controls actuation of the actuator arm 25 to position the head 550 at the location to write the data. In this example, processor 110a may be referred to as a master processor and processor 110b as a slave processor, since processor 110b controls the position of the head 550 at the direction of processor 110a.

In this example, the debug resources in the system 100 may be used to debug various operations of the controller 510. Further, the debug circuit 130 can be used to halt operation of one or more processors of the controller 10 when the controller 510 is released from a reset so that the debugger 150 can program the debug resources. When the debugger 150 has completed programming the debug resources, the debugger 150 can release the one or more processors of the controller 510 from the halted state.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A system, comprising:
a processor; and
a debug circuit comprising:
a reset circuit configured to detect when the system is released from a reset;
a debugger detection circuit configured to detect whether an external debugger is connected to the system at a time the reset circuit detects a release from the reset; and
a halt circuit configured to halt operation of the processor when the debugger detection circuit detects the debugger at the time of release from the reset.

2. The system of claim 1, wherein the halt circuit is configured to not halt operation of the processor until a next reset of the system when the debugger detection circuit does not detect the debugger at the time of release from the reset.

3. The system of claim 1, wherein the debugger detection circuit is configured to detect whether the debugger is connected to the system by receiving a signal from the debugger when the debugger is connected to the system.

4. The system of claim 1, wherein the debug circuit comprises a debugger release circuit configured to detect a halt release from the debugger, and the halt circuit is configured to release the processor from a halted state when the debugger release circuit detects the halt release from the debugger.

5. The system of claim 4, wherein, after releasing the processor from the halted state, the halt circuit is configured to not halt operation of the processor until a next reset of the system.

6. The system of claim 1, wherein the reset corresponds to a power on reset.

7. The system of claim 1, further comprising a trace source configured to collect trace information from the processor while the processor is running, and to output the trace information to the debugger.

8. The system of claim 7, wherein the trace source is programmable by the debugger through a debug access port.

9. The system of claim 1, wherein the system is integrated on a chip.

10. The system of claim 1, wherein the system is on a printed circuit board.

11. A method of debugging a system including a processor, comprising:
detecting when the system is released from a reset;
detecting whether a debugger is connected to the system at a time of release from the reset; and
halting operation of the processor when the debugger is detected at the time of release from the reset.

12. The method of claim 11, further comprising not halting operation of the processor until a next reset of the system when the debugger is not detected at the time of release from the reset.

13. The method of claim 11, wherein the detecting whether the debugger is connected to the system comprises receiving a signal from the debugger when the debugger is connected to the system.

14. The method of claim 11, further comprising:
detecting a halt release from the debugger; and
releasing the processor from a halted state when the halt release from the debugger is detected.

15. The method of claim 14, further comprising, after releasing the processor from the halted state, not halting operation of the processor until a next reset of the system.

16. The method of claim 11, wherein the reset corresponds to a power on reset.

17. The method of claim 11, further comprising:
collecting trace information from the processor while the processor is running; and
outputting the trace information to the debugger.

18. The method of claim 17, further comprising:
programming a trace source to collect the trace information from the processor when the processor is in a halted state; and
after programming the trace source, releasing the processor from the halted state.

19. A disk drive, comprising:
a disk;
a head configured to write data to and read data from the disk;
a processor configured to control operation of the disk drive; and
a debug circuit comprising:
a reset circuit configured to detect when the disk drive is released from a reset;
a debugger detection circuit configured to detect whether an external debugger is connected to the disk drive at a time the reset circuit detects a release from the reset; and
a halt circuit configured to halt operation of the processor when the debugger detection circuit detects the debugger at the time of release from the reset.

20. The disk drive of claim 19, wherein the halt circuit is configured to not halt operation of the processor until a next reset of the disk drive when the debugger detection circuit does not detect the debugger at the time of release from the reset.

* * * * *